United States Patent [19]
Patton

[11] Patent Number: 5,845,160
[45] Date of Patent: Dec. 1, 1998

[54] METHOD FOR TRANSFERRING A RECORDING FROM A SOUND INDEX PRINT AND PLAYER-TRANSFER APPARATUS

[75] Inventor: David L. Patton, Webster, N.Y.

[73] Assignee: Eastman Kodak Company, Rochester, N.Y.

[21] Appl. No.: 852,914

[22] Filed: May 8, 1997

[51] Int. Cl.[6] ................................................. G03B 17/24
[52] U.S. Cl. ........................................... 396/312; 434/308
[58] Field of Search ............................ 396/312; 434/169, 434/308; 446/397

[56] References Cited

U.S. PATENT DOCUMENTS

| | | |
|---|---|---|
| 3,551,042 | 12/1970 | Brink et al. . |
| 4,005,530 | 2/1977 | Takahashi et al. . |
| 4,363,055 | 12/1982 | Lee . |
| 4,385,814 | 5/1983 | Elliott . |
| 4,568,161 | 2/1986 | DiGianfilippo et al. . |
| 4,616,926 | 10/1986 | DiPietro et al. . |
| 4,765,734 | 8/1988 | Truc et al. . |
| 5,424,790 | 6/1995 | Tsunefuji et al. . |
| 5,428,417 | 6/1995 | Lichtenstein . |
| 5,433,610 | 7/1995 | Godfrey et al. .......................... 434/308 |
| 5,436,682 | 7/1995 | Katoh et al. . |
| 5,520,544 | 5/1996 | Manico .................................... 434/308 |
| 5,526,011 | 6/1996 | Hix et al. . |
| 5,541,644 | 7/1996 | Nanba . |
| 5,623,710 | 4/1997 | Ogawa . |
| 5,757,468 | 5/1998 | Patton et al. ............................. 396/312 |

*Primary Examiner*—Russell E. Adams
*Attorney, Agent, or Firm*—Robert Luke Walker

[57] ABSTRACT

A recording transfer method and apparatus. In the method, an index print having an array of imagettes and a plurality of recordings is provided. The recordings are individually associated with respective imagettes. A set of digital image files is provided on a digital memory store. The digital image files each correspond to a respective imagette. The index print and an array of switches are aligned. The array of switches has at least one switch in registry with each imagette. The switches are allocated to an array of triggers. The triggers each have a uniquely associated imagette and have at least one switch in registry with the imagette. The array of triggers has at least one trigger associated with each of imagette. A plurality of switches are actuated to define a series of imagettes associated with respective triggers. Individual recordings are, in response, associated with individual digital image files corresponding to the series of imagettes.

19 Claims, 7 Drawing Sheets

METHOD FOR TRANSFERRING A RECORDING FROM A SOUND INDEX PRINT AND PLAYER-TRANSFER APPARATUS

CROSS REFERENCE TO RELATED APPLICATIONS

This application is related to the following application filed concurrently herewith:

"Method for Sequencing Film Image Presentations and Film Image Sequencer" of David L. Patton, Daniel M. Pagano, Dale F. McIntyre, and Edward Weissberger (Attorney Docket No. 75448RLW).

FIELD OF THE INVENTION

The invention relates to photographic index prints and methods for manipulating film image-related sound recordings and in particular relates to a method for transferring sound from a sound index print to a computer and a sound index print player-transfer apparatus.

BACKGROUND OF THE INVENTION

Ordinary photographic prints and photographic index prints do not have sound associated with them. The same thing is true for ordinary digitized photographs, i.e., digital image files, in a digital memory store, such as a Kodak PhotoCD™ compact disc, KODAK Picture Disk floppy disc, or files produced by scanning a photographic print using a print scanner. U.S. patent application Ser. No. 08/796,323, entitled "IMAGE-AUDIO PRINT, METHOD OF MAKING AND PLAYER FOR USING", filed Feb. 7, 1997 by C. S. Bell et al, (hereafter referred to as the "IMAGE-AUDIO PRINT PATENT") which is hereby incorporated herein by reference; discloses single image prints and index prints which include audio data storage means for each image. The application also discloses a player that receives the index print in a predetermined location. The player has a touchscreen that is positioned to overlie the print. Touching the touchscreen over an image actuates audible playback of audio data for that image. The player includes a memory into which any of the audio data can be conveyed and from which audio data can be moved into other prints or other positions on the same print.

It would be desirable to provide a method and apparatus for transferring recordings from a sound index print to a digital memory store having corresponding digital image files.

SUMMARY OF THE INVENTION

The invention is defined by the claims. The invention, in its broader aspects, provides a recording transfer method and apparatus. In the method, an index print having an array of imagettes and a plurality of recordings is provided. The recordings are individually associated with respective imagettes. A set of digital image files is provided on a digital memory store. The digital image files each correspond to a respective imagette. The index print and an array of switches are aligned. The array of switches has at least one switch in registry with each imagette. The switches are allocated to an array of triggers. The triggers each have a uniquely associated imagette and have at least one switch in registry with the imagette. The array of triggers has at least one trigger associated with each of imagette. A plurality of switches are actuated to define a series of imagettes associated with respective triggers. Individual recordings are, in response, associated with individual digital image files corresponding to the series of imagettes.

It is an advantageous effect of at least some of the embodiments of the invention that a method and apparatus are provided for transferring recordings from a sound index print to a digital memory store having corresponding digital image files.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

The apparatus and method of the invention provide a convenient way to add sound or similar recordings, provided on a sound index print, to related individual digital image files in a digital memory store, that is, a digital computer file storage medium, such as a hard disk, a floppy disk, an optical storage or tape drive or the like. The digital memory file can be part of a computer or can be a separate memory storage unit.

Referring now to FIGS. 1–4, the apparatus 10 of the invention is used with the digital memory store 12 and a sound index print or image-audio print 14. The digital memory store 12 includes a set 16 of digital image files 16a (symbolized in FIG. 1 by a dashed line boxes). The term "image file", and like terms are used herein in the singular to describe a digital representation of an individual image; however, it will be understood that the image file may be a collection of individual computer files all directed to the same digital image. The term "image" is used separately herein to refer to the subject matter or program content of image files and imagettes and the other representations. Common "images" have the same subject matter, but may vary in information density, i.e., detail; and may be subject to a variety of standard modifications.

The image files 16a each contain a digital "image", the information or program content necessary to create a viewable representation using particular imaging software and equipment. The creation and manipulation of image files, and necessary software and equipment are well known to those of skill in the art. The imagettes 18 present miniature, human-viewable representations of images. In film processing, index prints 14 are commonly provided along with the same images in another form, for example, photographic prints bearing larger versions of the same images. The imagettes are commonly subject to a standardized modification for ease of viewing. For example, film negatives are commonly represented in index prints by positive images on photographic paper.

The invention is directed to use with an associated set 16 of digital image files 16a and index print 14; that is, an index print-image files assemblage in which the index print or prints 14 have imagettes 18 corresponding to respective image files 16a of the set 16 in the digital memory store 12. The sound index print 14 also has recordings or data files (represented in FIG. 1 by dashed circles 22) that correspond to respective images presented in the imagettes 18. The nature of the information in the recordings is not critical; however, the invention is particularly useful for sound recordings, since the difficult process of organizing and manipulating sound files directly is replaced by the organization of the image print and visual representations corresponding to the sound recordings. The recordings can have been made contemporaneously with capture of the images or can have been recorded independently.

The sound index print 14, like a conventional index print has a support 24 that has imagettes 18 produced by a photographic or other print process. The sound index print 14 includes a data storage unit 20 that is integral with or retained against the support 24. (In FIG. 1, the location of the audio data storage unit 20 is indicated by a dashed line.) The data storage unit 20 can be any accessible means for storing audio data or the like, but is preferably a randomly accessible nonvolatile memory, such as an EEPROM. The index print receiver 35, which is discussed in greater detail below, includes an interface 26 for the data storage unit 20. Further details as to sound index prints 14, audio data storage means 20, and interfaces 26 are presented in the IMAGE-AUDIO PRINT PATENT.

The apparatus 10 has an input unit 32 that is operatively connected to the digital memory store 12 by a signal path 52. The apparatus 10 can be provided in a single housing or can be divided between several housings (not shown), thus the signal path can be external or internal. The invention is not limited to any particular type of signal path 52 between the components 32,12. The components can be hard wired together or can be connected by wireless means such as infrared data communication linkages. Components can be connected via a computer network through modem connections by dedicated or shared network lines. Signal paths can provide for real-time or delayed data transmission. Communication between components can be provided on a delayed basis by storing information on a data storage medium, such as computer disk.

The apparatus 10 transfers sound recordings 22 along the signal path 52 (in the direction indicated by arrow 28) to the digital memory store 12. The digital memory store 12 includes a read-write unit (not separately illustrated) that provides access to stored computer files and copying of files into the digital memory store. The terms "transfer" and "copy" and like terms are used herein with reference to replication of computer files, with or without deletion of the original file.

Figure 1:
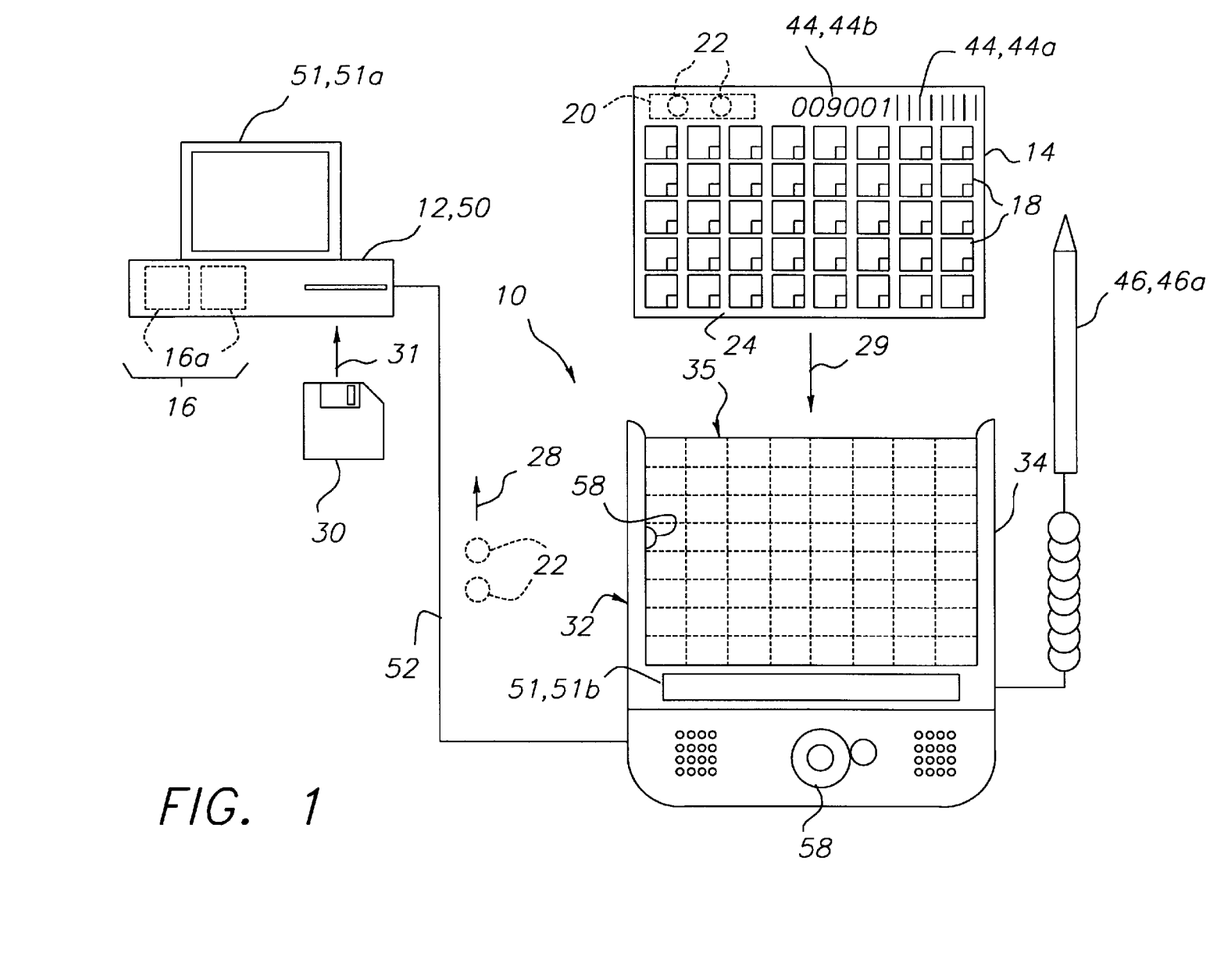
FIG. 1 is a semi-diagrammatical view of an embodiment of the apparatus of the invention and an index print and digital memory store.

Image files 16a can originate in the digital memory store 12, but in most cases will be copied (symbolized in FIG. 1 by arrow 31) into the store 12 from a file source (symbolized in FIG. 1 by a floppy disk 30). The invention is not limited as to the file source 22. Suitable file sources 30 include discrete digital storage media, such as Photo CD, floppy disk, or digital tape; input devices such as print and filmstrip scanners and digital cameras; and local and remotely accessed computer networks.

The input unit 32 of the apparatus 10 includes an index print station 34 and a signal generator 36. The index print station 34 has a receiver or recess 35 for the index print 14. The signal generator 36 has an array 39 of switches 38 that are closely adjacent the receiver 35 of the index print station 34. The receiver 35 is configured to receive an index print 14 in a predetermined alignment with the switch array 39, such that the imagettes 18 of the index print 14 overlap the switches 38 and the data storage unit 20 is in operative contact with the interface 26. The latter can be accomplished in a number of ways, for example, the data storage unit 20 and interface 26 can have complementary conductors (not shown) that slide together when the index print is inserted into the receiver 35 in the direction of arrow 29.

Referring now to FIGS. 1–5, in some embodiments of the invention, the input unit 32 is configured for use with index prints 14 made on only one size of paper or transparency media. The receiver 35 is sized to loosely retain the index print 14 in a substantially invariant relation to the array of switches 38. The index print 14 is movable, within the receiver 35 in directions parallel to the longer dimensions of the index print, by a distance that is a small fraction of the dimensions of an individual imagette in the same directions. The depth of the receiver 35 in a direction parallel to the thickness of the index print is not critical, however, the index print 14 should seat closely against the platen 42 and the data storage unit 20 and interface 26 should have good contact. For example, in the embodiment shown in FIGS. 2 the receiver 35 is a slot having a thickness slightly larger than that of an index print 14. The interface 26 is slightly recessed to accommodate the data storage unit 20. The receiver 35 is bordered by spaced apart upstanding flanges 40 positioned to contact or closely border the margins of the index print 14. At one end the flanges define a narrow, generally rectangular index print entrance 41. The receiver can have a set-back or cut-away portion (not shown) adjoining the entrance to allow the user to easily grip a portion of the index print for loading and unloading. The receiver of the index print station is not limited to a slot, but can instead be a recessed area, physically delineated part of the surface of the index print station, or an interior defined by a movable part of the index print station.

Figure 5:
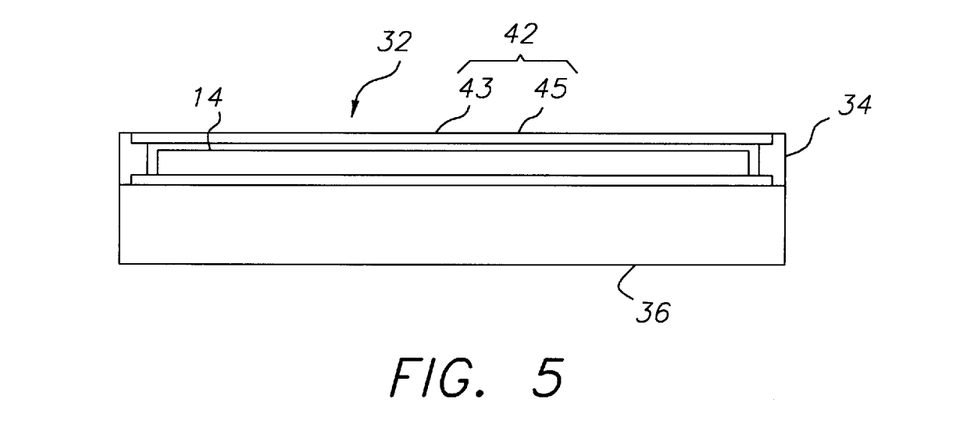
FIG. 5 is a cross-sectional view of the index print station of another embodiment of the apparatus of the invention. Some dimensions in this and other figures are exaggerated for clarity.
Figure 6A:
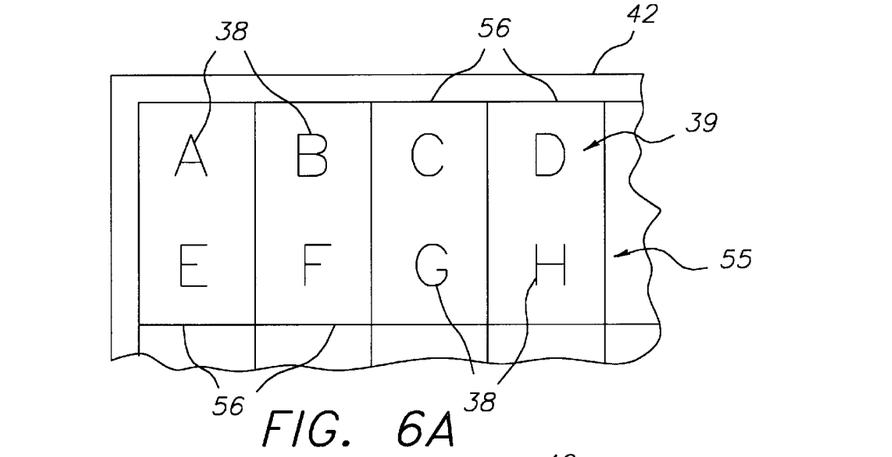
FIGS. 6A–6C are semi-diagrammatical partial top plan views of the index print station of the apparatus of FIG. 1, with differently arranged index prints.
Figure 6B:
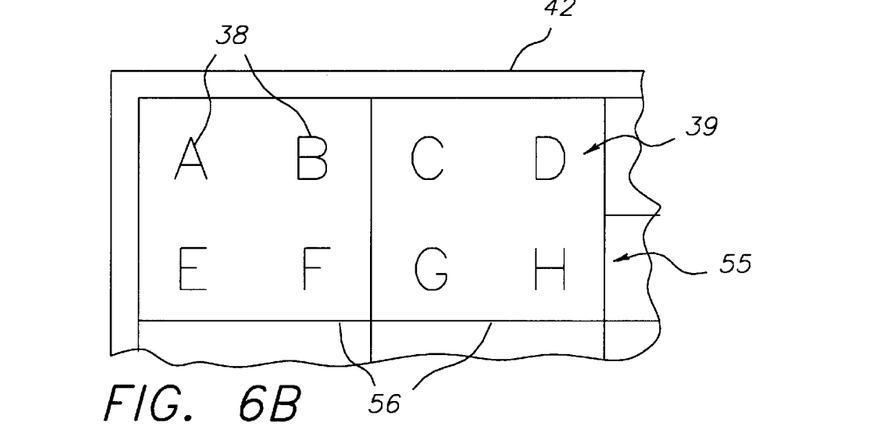
Figure 6C:
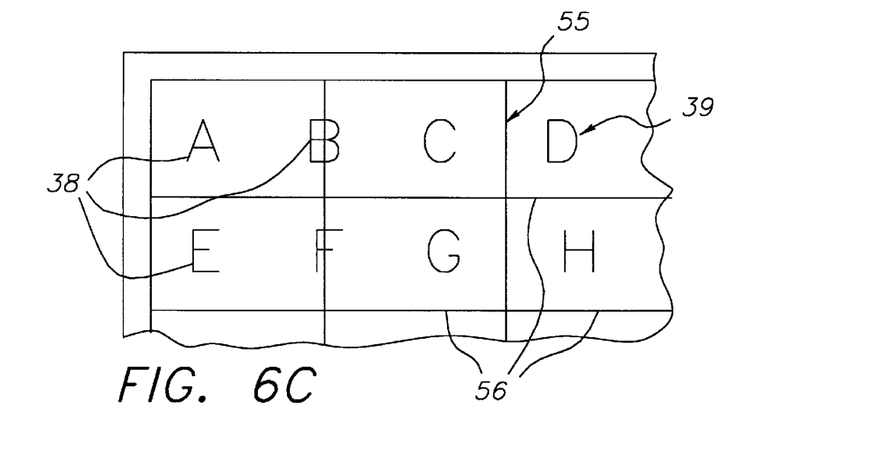
Figure 7:
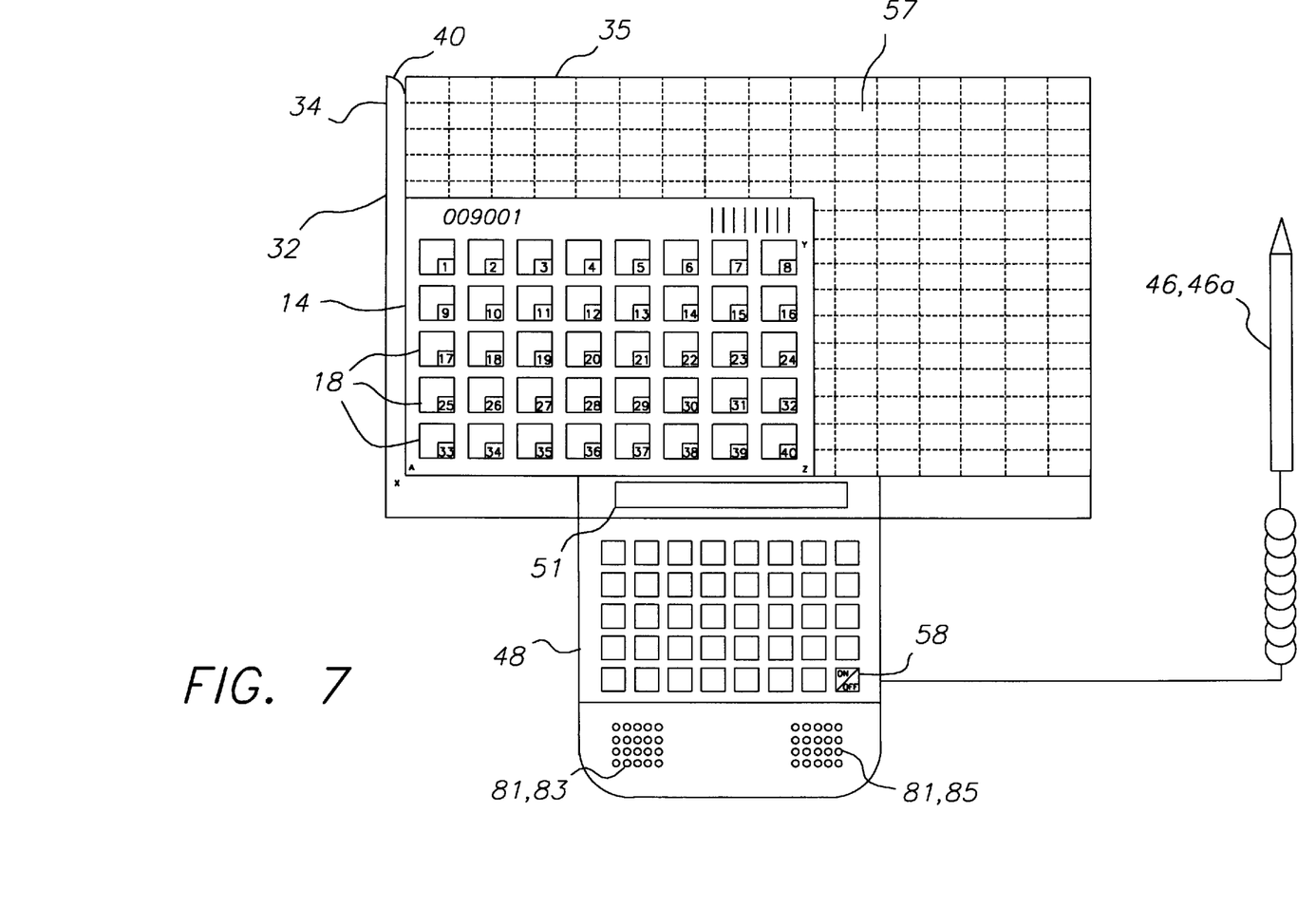
FIG. 7 is a top plan view of the input unit of another embodiment of the apparatus of the invention.

Referring again particularly to the embodiment of the invention shown in FIGS. 5-7, the input unit 32 has a platen 42 that underlies the receiver 35. The platen closely adjoins and has major dimensions generally parallel to the major dimensions of the receiver 35. The platen 42 is aligned with the receiver 35 such that there is at least a partial overlap between the platen 42 and every imagette 18 of an image print 14 resting in the receiver 35. The interface 26 can be recessed (not shown) relative to the platen 42 or otherwise configured to allow substantially continuous contact between the platen and overlying portions of the index print.

As shown in FIG. 5, the platen 42 can have two parallel sub-units 43,45 which sandwich the receiver 35. The upper sub-unit 43 is transparent so that the imagettes are all freely viewable within the receiver 35. It is preferable that the platen 42, and the receiver 35, be planar or substantially planar, since greater curvature would make it more difficult to simultaneously view all of the imagettes of an index print.

In using the apparatus 10, the image file set 16 in the digital memory store 12 and the index print 14 must first be matched to each other. A secondary matching must then be provided between individual image files 16a and respective imagettes 18. This is preferably provided by a default common order of imagettes 18 and image files 16a corresponding to an order of image capture or film processing or the like. The default order can be presented by numbers 17 (shown in FIG. 4) on imagettes 18 or simply the placement of the imagettes 18 on the index print 14. The image files 16a can similarly include digital representations of the imagette numbers or can have a particular order or location or the like in the image file set 16.

The matching of file set 16 and index print 14 can be provided by the user based on physical association or commonality of images in the file set 16 and index print 14. It is preferred, however, that the apparatus 10 be capable of matching identifiers 44 in the file set 16 and on an index print 14 resting in the receiver 35 of the index print station 34. The term "identifier" and similar terms are used herein to refer to a group of alphanumeric characters or other indicia usable for identification purposes. The nature of the matching provided and the necessary features of the apparatus 10 are dependent upon the identifiers 44 present or absent from the file set 16 in the digital memory store 12 and the index print 14.

The file set 16 can include an identifier (not illustrated) and the index print 14 can bear a common machine readable identifier or identification number 44a. The index print 14 can also bear the identifier in both machine and human readable form 44a,44b. The machine readable identification numbers can be bar codes.

Figure 2:
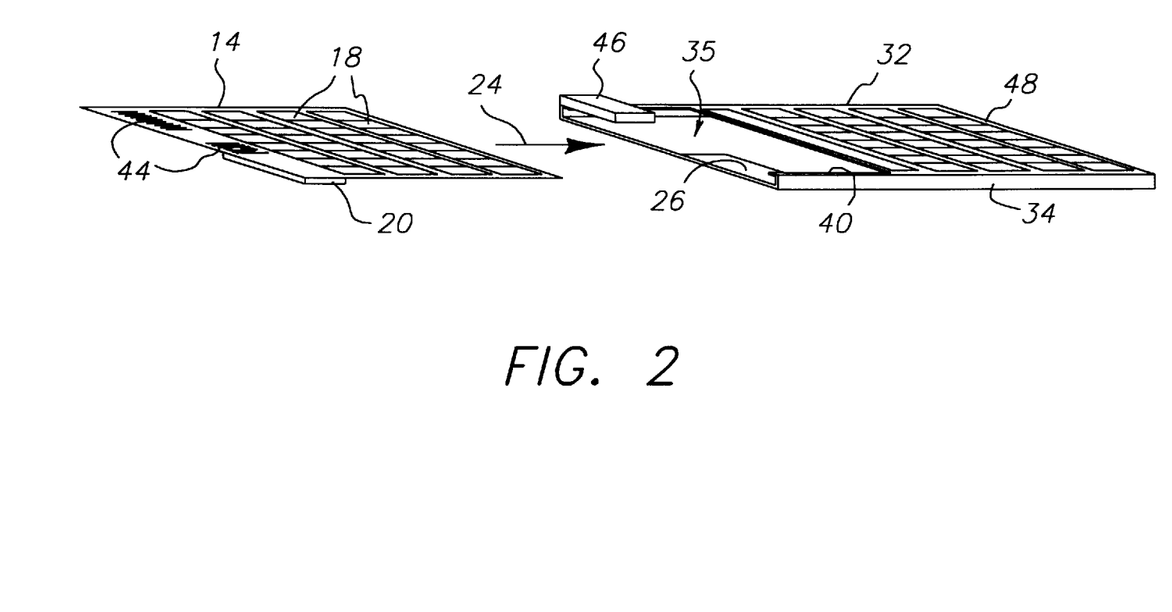
FIG. 2 is a perspective view of the input unit of another embodiment of the apparatus of the invention. The direction of index print loading is indicated by an arrow.

A particular identification number can be selected to be unique or substantially unique to the particular set 16 of image files 16a and index print or prints 14. A embodiment of the apparatus 10 adapted to match such sets of image files and index prints 14 can have a read element 46 disposed for reading the machine readable identification numbers 44 on the index print 14. The read element 46 can be permanently mounted, as shown in FIG. 2, facing a predetermined portion of the receiver 35, in which case, no user action is required for matching. One or both read elements 46 can also be mounted such that a user is required to take an action, such as relative positioning of reader 46 and index print 14. For example, the read element 46 for an input unit 32 can be a bar code reading wand 46a attached a flexible cable. This element 46a requires the user to swipe the index print identification bar code 44. The read element 46 and the digital memory store 12 can each generate an identification signal responsive to the respective identifiers 44. The signals can then be transmitted to a controller 50 and are compared. An indication of matching or non-matching can be provided to the user by means of a display 51 or other output device operatively connected to the controller 50. The controller 50 is a computing device capable of handling the computing operations discussed in this application. The controller can utilize a digital microprocessor and can be a discrete unit or part of a suitably programmed computing device that includes the digital memory store 12. A display 51a can be provided with the controller 50 or a display 51b can be provided as a part of the input unit 32, or both.

The comparison of the signals to determine "matching" or "non-matching" can be, in effect, a determination of whether represented indicia are identical. The comparison is not, however, limited to matching-up identical values, but rather covers correlation procedures generally. For example, identifiers on the digital memory store and index print can differ in a predetermined manner, and the comparison can utilize a look-up table or first modify one or both identifiers using mathematical formulas, before analyzing for sameness. Similarly, identifiers on a digital memory store and pair of associated index prints can match both prints to the digital memory store; and, in addition, can match the collection of imagettes on each index print to a respective set of image files in the digital memory store.

Alternatively, the index print 14 can be limited to an identifier 44b that is only human readable. For this situation, the input device 32 can be provided with an input keypad 48 to allow the user to key in the identification number, which is then converted to an identification signal. The controller 50 then compares identification signals as previously described. If the set of image files in the digital memory store 12 lacks a machine readable identifier, the digital memory store can write an identifier to the set of digital image files in the digital memory store 12, at that time. A similar approach applies if no identifier is provided associating a digital memory store 12 and index print 14. The user can key in an identifier or the controller can generate an identifier, which can then be written to the set of files in the digital memory store 12. The recording of the identifier on the index print 14 can be a manual step in which the identifier is signaled to the user, who then manually writes the identifier on the index print 14. This is inconvenient for a variety of reasons, including that it is difficult to write on the front surface of an ordinary index print 14. Index prints 14 could be modified for this purpose, but this approach would remain cumbersome. A more convenient alternative is providing a writer (not separately illustrated) in the read element 46 of the input unit 32. The writer could be a magnetic or optical recording head or printer positioned to write on an area of recordable media provided on an index print or writing on a separate piece of tape or other media (not shown) for transfer to the index print.

A particular apparatus of the invention can include identifier matching features necessary for one or more of the above approaches or can combine features of different approaches.

Figure 3:
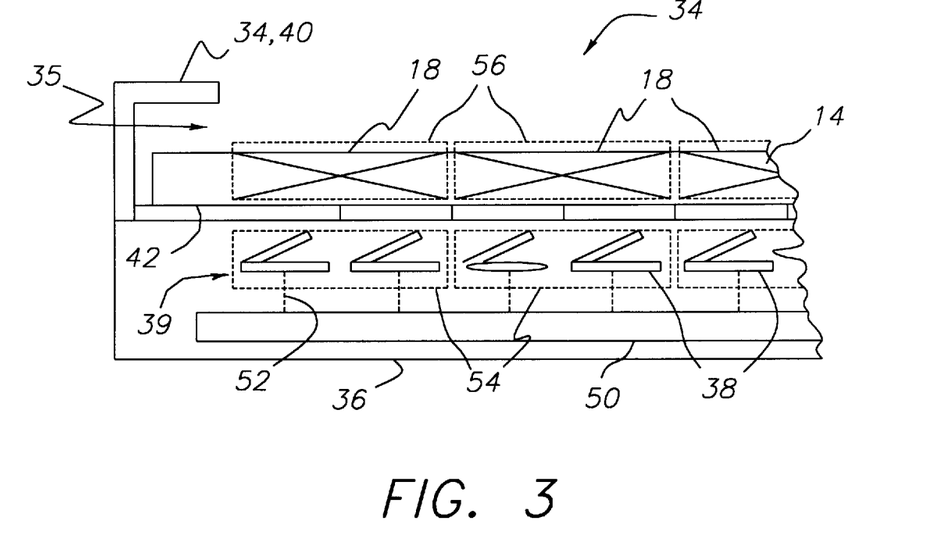
FIG. 3 is a semi-diagrammatical partial cross-sectional view of the index print station of the apparatus of FIG. 2.
Figure 4:
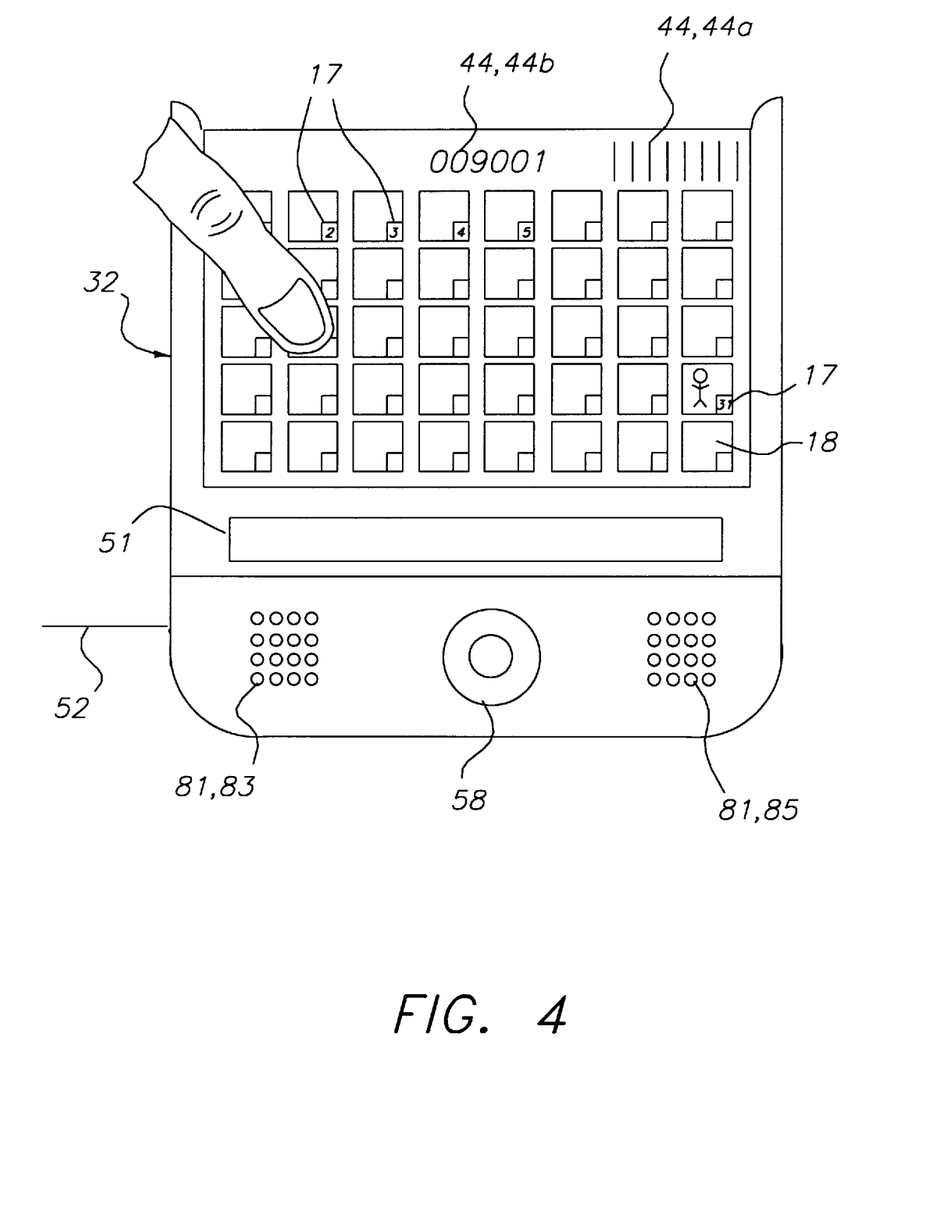
FIG. 4 is a top plan view of the input unit of the apparatus of FIG. 1. Representative imagette image content and imagette numbers are shown.

Referring to FIG. 3, the switches 38 adjoin the platen 42 and are actuable through the platen 42. Each switch 38 can produce a unique signal responsive to actuation of the switch 38. The platen 42 can be flexible or otherwise configured so as to permit switch actuation. The platen 42 is illustrated in the figures as a membrane or pair of membranes; however, the platen need not be a continuous element. The platen can be a series of discrete, individually movable levers or keys (not shown).

For a presentation to be programmed, the switch array 39 must be correlated with the index print 14. (Prior to that correlation, an index print 14 and set of image files are loaded in the index print station 34 and digital memory store 12, respectively, and matched as previously discussed.) In the correlation, the signals from the individual switches 38 are grouped to define an array 55 of triggers 54 and an array 57 of adjacent sites 56 on the platen 42. (The platen site array is shown in FIGS. 1 and 7 by dashed lines.) Each site 56 adjoins, on a one-to-one basis, the respective imagette 18 (symbolized in FIG. 6 by an elongate "X"). Each trigger 54 includes at least one switch 38. The switch or switches 38 for each trigger 54 are actuable in the immediate vicinity of the respective site 56. A trigger 54 can include a single physical switch 38, which is actuated to provide the signal for that trigger 54 or can include a number of adjacent switches 38, any of which can be actuated to provide a signal. A trigger 54 can also be a combination of two or more physical switches 38, which must be actuated in combination to provide a signal for that trigger 54. Suitable software, or devices, or a combination of the two, for grouping the switches is well known to those of skill in the art.

The operating principle of the switches 38, and how the switches 38 are actuated in the immediate vicinity of respective sites 56, is not critical. For example, the switches 38 can be mechanical pressure switches, or optical or other sensors, or elements of a touch sensitive screen. In the latter case, the platen can be part of a larger touch sensitive screen assembly. The array of switches 39 can overlie or underlie the receiver 35. In the former case, the switch array 39 needs to be transparent or substantially transparent so as to allow viewing of the imagettes 18. In a particular embodiment of the invention, the switches 38 are individual pressure sensitive switches or areas of touch screen which are actuated either by pressing on a platen site 56 directly over a respective imagette 18 or by pressing indirectly on the platen 42, by first pressing on a respective imagette 18 overlying a platen site 56. If desired, a protective member (not shown) can overlie an otherwise uncovered index print 14 to protect against damage.

The triggers 54 are subject to actuation in a non-predetermined series, i.e. a user determined series. The signal generator 36 produces a series signal responsive to the trigger actuations in the series. The digital memory store 12 is operatively connected to the signal generator 36 by signal paths 52 and a controller 50. Details of signal generation, transmittal and recording are well known to those of skill in the art. For example, the operative connections can be conductors or a wireless signal transmitter to a controller in the form of a microprocessor based computing device, such as a personal computer, and the series signal and recorded data can utilize software protocols utilized for data transfer and storage. The microprocessor can be incorporated in the apparatus 10, or can be a discrete device, or part of some other mechanism, such as a programmable film projector or other imaging display device. For reasons of economy, it is generally preferred that the same controller be used for all the various functions discussed here; however, separate dedicated controllers could be provided.

The index prints currently provided by film processors commonly vary the number of imagettes on a single index print as an inverse function of the nominal frame count of a processed filmstrip. Imagettes 18 thus do not necessarily have a single fixed size. This can be dealt with by limiting a particular apparatus 10 to index prints 14 having imagettes 18 in a single type of array having predetermined imagette sizes and locations. In this case, sites on the platen 42 are fixed and the trigger array 55 is predetermined, such that correlation of triggers 54 to platen sites 56 occurs automatically as an index print 14 is loaded into the receiver 35.

A particular apparatus 10 can instead be limited not to a single imagette array, but rather a series of predetermined imagette arrays. In this case, triggers 54 and platen sites 56 are likewise predetermined, at on an alternate basis. Simplified examples are shown in FIGS. 6A–6C. Switches 38 of the array 39 are symbolized by letters. Each platen site 56 (indicated by a rectangle) overlaps a single switch 38 or combination of switches 38. Triggers have dimensions corresponding to the platen sites; but, for clarity, are not shown. In FIG. 6A, platen sites 56 each overlap a single switch 38 and the site and trigger arrays 57,55 correspond to the switch array 39. In FIG. 6B, platen sites 56, and corresponding triggers, each overlap four switches 38. Redundant switches can be ganged or deactuated, either physically or by means of software. Similarly, as shown in FIG. 6C, platen sites 56 can overlap switches 38, such that the trigger for each imagette is defined by a unique pair of switches, but individual switches may be actuated for more than one trigger. A hardware or software switch can be provided to allow switching among the members of the series of predetermined imagette arrays.

In a particular embodiment of the invention, the apparatus 10 is not limited to one or a series of predetermined imagette arrays. In this embodiment, the apparatus 10 maps a trigger array in response to an array size signal. Such a signal can be generated from information recorded at the time of film processing and later read by a read element 46 used to obtain other information from the index print, or can be generated by the user, or can be generated by a combination of the two. In a currently preferred embodiment of the invention shown in FIG. 7, the user first seats the index print 14 in the index print station 34. The receiver 35 can be oversized to accommodate index prints in multiple sizes. The index print 14 is abutted against flanges 40 on two sides such that a corner (not shown in FIG. 10) occupies the location indicated in FIG. 10 by "X". The user then inputs imagette array parameters by actuating switches defining lower left, and upper and lower right boundaries of the imagette array, indicated in FIG. 10 by "A", "Y", and "Z", respectively. The user also inputs the number of imagettes in each column and row; for example, by typing in the numbers on a keypad 48. The imagette array information can be recorded in the file set 16.

The input unit 32 can include a variety of convenience controls and features, such as a power on-off switch 58. A common switch can be provided for both the input unit 32 and the recording unit 30. In a particular embodiment of the invention, the power on-off switch 58 can also be actuated and deactuated by inserting and removing an index print 14. A timer can be provided to automatically deactuate the power switch after period of non-use. The input unit 32 can include lighting (not shown) for the index print 14 and lighting controls can be provided.

In addition to the features already discussed, the input unit 32 (see FIG. 4) can include a playback system 81 having a speaker or audio output 83 and means for accessing the individual sound recordings. The latter preferably utilizes the triggers 54 to designate selected recordings. Features necessary to allow the input unit to switch between functions, such as recording play and transfer, and appropriate software for such purposes are within the knowledge of one of skill in the art. The playback system 81 can also include editing controls and a microphone or audio input 85, which can be utilized in a to edit individual sound recordings. The playback system can also allow the user to switch or copy sound recordings associated with individual imagettes to other imagettes. The trigger array can be utilized to designate, in effect, source and destination imagettes; by pointing to an imagette on the index print which contains the sound file for that imagette, and then pointing to a different imagette.

The keypad or control panel 48 can have one or more convenience controls such as a separate on-off switch 58 for deactuation to prevent inadvertent use during file transfer. The control panel 48 can be joined to the index print station 34 for ease of transport and storage or can be separate to allow the user greater latitude in placement of the portions of the input unit 32. The control panel can provide dedicated keys or other input devices for particular functions or can utilize general purpose computer peripherals, such as keyboards and other input devices along with appropriate software. Suitable devices and software are well known to those of skill in the art.

The apparatus 10 can be configured to have the display 51 indicate recent user actions and present messages to the user. A moderate size liquid crystal display 51 disposed on a structural member extending between the index print station and the control panel is convenient. The display can be lighted and otherwise configured for user convenience. In a particular embodiment of the invention, the display can show a grid of numbered cells representing the imagettes of an index print 14 in the index print station 34. The grid representation can change to show recording transfers and other information.

Figure 8:
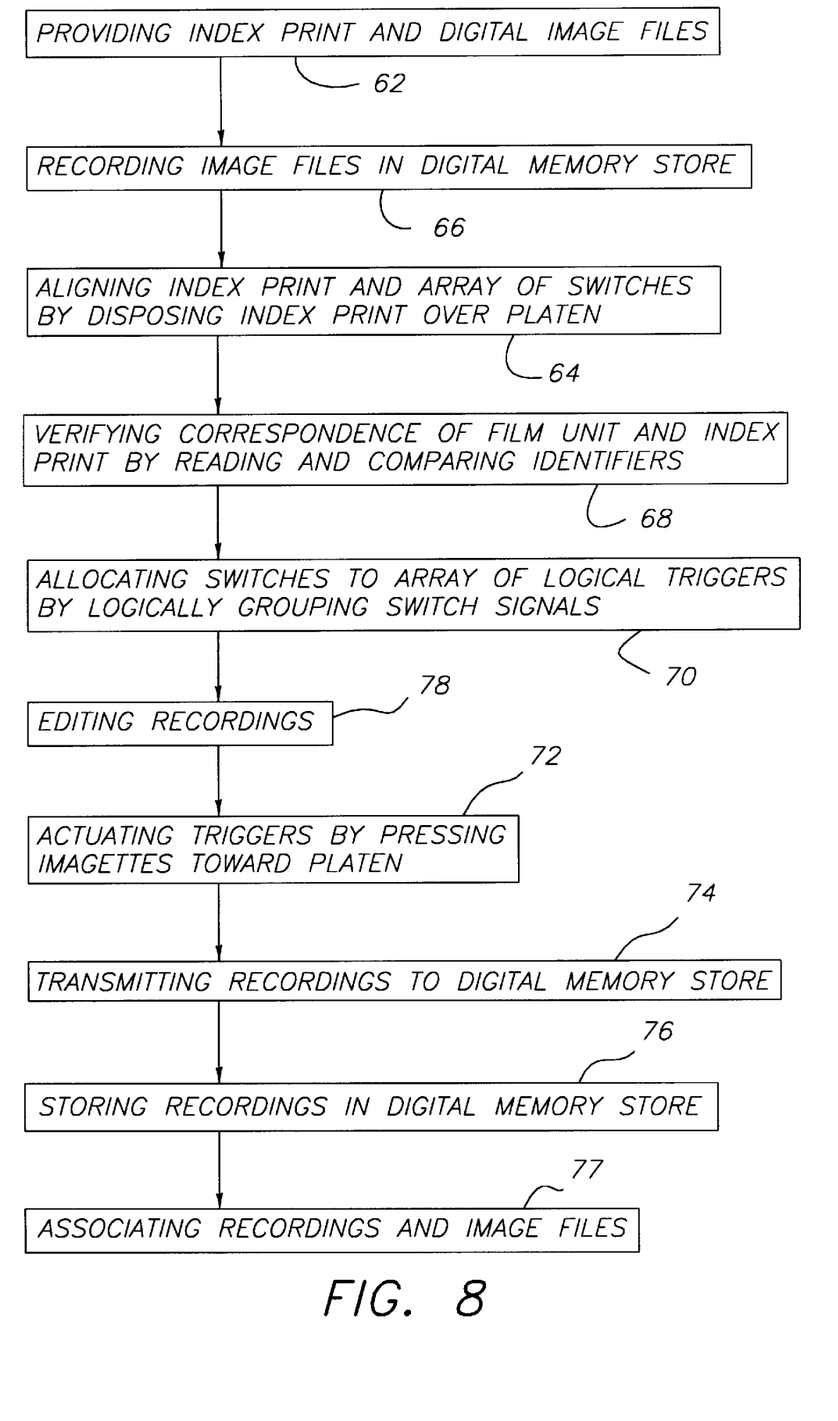
FIG. 8 is a flow-chart of the method of the invention.

Referring now to FIG. 8, the method of the invention for transferring a recording from a sound index print to a set of image files in a digital memory store has the following steps. The method begins by providing (62) a sound index print and a set of digital image files. The index print 14 has an array of imagettes corresponding to the image files of the digital memory store 12. The set of digital image files is loaded (66) in the digital memory store 12. The index print 14 is loaded (64) on a platen 42 of an index print station 34 such that the index print 14 and an array of switches of the index print station 34 are disposed in overlapping relation. Correspondence of the digital memory store 12 and index print 14 is verified (68). The digital memory store 12 and the image print can each have a machine readable identifier. In that case, the digital memory store 12 and index print 14 can be matched by reading and comparing the identifiers 44. The index print 14 and the array 39 of switches 38 are correlated (70) by allocating the switches 38 to an array 55 of triggers 54, thus defining an array 57 of adjacent sites 56 on the platen 42. In the correlation, the switches 38 are grouped such that the array 55 of triggers has at least one trigger 54 associated with each imagette 18 and the triggers 54 each include at least one switch 38. The switches 38 of each trigger 54 are actuable from the immediate vicinity of a respective imagette 18. The triggers 18 are then actuated (72) in a non-predetermined; that is, user determined; series to transfer recordings to the set of image files. In actuating the switches, the respective imagettes 18 are simultaneously denoted by the user, preferably by pressing on the platen site 56 for a respective imagette 18 (as illustrated in FIG. 7). Recordings are transmitted (74) responsive to the trigger actuations. The digital image store receives and stores (76) the recordings, and, preferably, associates (77) the recordings with the set 16 of image files. If desired, the recording are edited (78) prior to transfer.

The invention has been described in detail with particular reference to certain preferred embodiments thereof, but it will be understood that variations and modifications can be effected within the spirit and scope of the invention.

PARTS LIST apparatus 10
digital memory store 12
sound index print 14
set of image files 16
image file 16a
imagettes 18
numbers 17
audio data storage unit 20
recordings 22
support 24
interface 26
arrow 28
arrow 29
file source 30
arrow 31
input device 32
index print station 34
receiver 35
signal generator 36
array of switches 38
flanges 40
index print entrance 41
platen 42
platen sub-unit 43
identifiers 44
machine readable identifier 44a
human readable identifier 44b
platen sub-unit 45
read elements 46
bar code reading wand 46a
input keypad 48
controller 50
display 51
separate display 51a
incorporated display 51b
Signal path 52
triggers 54
array of triggers 55
site 56
array of sites 57
power on-off switch 58
providing index print and image files (62)
aligning index print and switch array (64)
loading image files in digital memory store (66)
matching set of image files and index print (68)
allocating switches to trigger array (70)
actuating triggers (72)
transmitting signals (74)
recording sequence data (76)
recording editing data (78)
playback system 81
speaker or audio output 83
microphone or audio input 85

What is claimed is:

1. A recording transfer method comprising the steps of:
providing a index print having an array of imagettes and a plurality of recordings, said recordings being individually associated with respective said imagettes;
providing a set of digital image files, said digital image files each corresponding to a respective said imagette;
aligning said index print and an array of switches, wherein said array of switches has at least one switch in registry with each said imagette;
allocating said switches to an array of triggers, said triggers each having a uniquely associated imagette, said triggers each including at least one switch in registry with said imagette, said array of triggers having at least one trigger associated with each of said imagettes;
actuating switches of a plurality of said triggers to define a series of imagettes associated with respective said triggers; and
associating individual said recordings with individual said digital image files corresponding to said series of imagettes, responsive to said actuating of said switches.

2. The method of claim 1 further comprising the steps of: recording said set of digital image files in a digital memory store; transmitting said recordings to said digital memory store; and storing said recordings in said digital memory store.

3. The method of claim 1 wherein said index print is a sound index print and said recordings are sound recordings.

4. The method of claim 1 wherein said allocating step further comprises allocating said switches to a trigger array selected from a predetermined plurality of trigger arrays.

5. The method of claim 1 further comprising mapping said array of imagettes to said array of switches.

6. The method of claim 1 further comprising the step of verifying correspondence of said set of digital image files and said image print.

7. The method of claim 6 wherein said set of digital image files and said image print each have identifiers and said verifying step further comprises machine reading said identifier on said image print.

8. The method of claim 1 further comprising the step of editing said recordings.

9. The method of claim 1 wherein said actuating step further comprises actuating each said trigger from the immediate vicinity of a respective said imagette.

10. The method of claim 9 wherein said actuating step further comprises manually denoting said imagettes in a non-predetermined series.

11. The method of claim 1 wherein each said switch is actuable to produce a unique switch signal and said allocating step further comprises logically grouping said switch signals.

12. The method of claim 1 wherein said aligning step further comprises disposing said index print over a platen and said actuating step further comprises actuating switches of a plurality of said triggers in a non-predetermined series by pressing imagettes associated with respective said triggers toward said platen.

13. A method for copying sound recordings, comprising the steps of:

providing a sound index print having an array of imagettes and a plurality of sound recordings, said recordings being individually associated with respective said imagettes;

providing a set of digital image files recorded in a digital memory store, said digital image files each corresponding to a respective said imagette;

aligning said index print and an array of switches, wherein said array of switches has at least one switch in registry with each said imagette;

allocating said switches to an array of triggers, said triggers each having a uniquely associated imagette, said triggers each including at least one switch in registry with said imagette, said array of triggers having at least one trigger associated with each of said imagettes;

manually denoting said imagettes in a non-predetermined series of actuations of respective switches of a plurality of triggers allocated to said imagettes;

transmitting to said digital memory store, said recordings associated with respective said imagettes responsive to said actuations; and associating said recordings associated with respective said imagettes with corresponding individual digital image files.

14. A index print recording transfer apparatus, for use with a digital memory store, a set of digital image files, and an index print; said digital image files and said index print each bearing a common identification code; said index print having an array of imagettes corresponding to individual said image files of said set of image files; said index print having a plurality of recordings, said recordings being individually associated with respective said imagettes, said apparatus comprising:

an index print station having a receiver for said index print, said receiver being configured to receive an index print in a predetermined alignment;

a platen closely adjoining said receiver;

an array of switches aligned with said platen, said switches being allocable to an array of logical triggers corresponding on a one-to-one basis to imagettes on the index print, said triggers each having a unique site on said platen, said triggers each including at least one switch in registry with a respective said site;

means for transmitting to said digital memory store, an identification signal responsive to said identification code borne by said index print;

a signal generator having a array of switches adjoining said platen, said switches being disposed such that at least one switch is associated with each of said sites and is actuable from the immediate vicinity of the respective said site, said switches being subject to actuation in a non-predetermined series, said signal generator transmitting said recordings to said digital memory store responsive to said actuations and in association with said identification signal.

15. The apparatus of claim 14 wherein said index print is a sound index print and said apparatus further comprises a playback system operatively connected to said index print station to play said recordings.

16. The apparatus of claim 15 wherein said playback system includes means for editing said recordings.

17. The apparatus of claim 14 further comprising means for allocating said switches to a trigger array selected from a predetermined plurality of trigger arrays.

18. The apparatus of claim 14 further comprising means for mapping said array of imagettes to said array of switches.

19. The apparatus of claim 14 wherein said index print bears a machine readable identification code and said means for transmitting further comprises an identification code reader disposed in operative relation to said index print receiver.

* * * * *